(12) United States Patent
Kitahara et al.

(10) Patent No.: US 9,494,780 B2
(45) Date of Patent: Nov. 15, 2016

(54) INVERTED MICROSCOPE

(71) Applicant: OLYMPUS CORPORATION, Tokyo (JP)

(72) Inventors: Akihiro Kitahara, Hino (JP); Hironori Utsugi, Hachioji (JP); Yusuke Amano, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 390 days.

(21) Appl. No.: 13/851,921

(22) Filed: Mar. 27, 2013

(65) Prior Publication Data
US 2013/0258457 A1 Oct. 3, 2013

(30) Foreign Application Priority Data

Mar. 30, 2012 (JP) ................................. 2012-082611

(51) Int. Cl.
*G02B 21/00* (2006.01)
*G02B 21/24* (2006.01)

(52) U.S. Cl.
CPC ............ *G02B 21/0088* (2013.01); *G02B 21/24* (2013.01)

(58) Field of Classification Search
CPC .................................................. G02B 21/0088
USPC .................................... 359/368–398
See application file for complete search history.

(56) References Cited

U.S. PATENT DOCUMENTS

| 4,337,991 | A | * | 7/1982 | Benajam | ................ | G02B 21/24 |
| | | | | | | 359/391 |
| 5,270,855 | A | * | 12/1993 | Hasegawa | .............. | G02B 21/26 |
| | | | | | | 359/368 |
| 5,535,052 | A | * | 7/1996 | Jorgens | .............. | G02B 21/0028 |
| | | | | | | 359/368 |
| 6,160,662 | A | | 12/2000 | Uchida et al. | | |

(Continued)

FOREIGN PATENT DOCUMENTS

| EP | 2 579 086 | 4/2013 |
| JP | 11-038326 A | 2/1999 |

(Continued)

OTHER PUBLICATIONS

Extended European Search Report (EESR) dated Jun. 20, 2013 (in English) issued in counterpart European Application No. 13161635.1.

(Continued)

*Primary Examiner* — Thomas K Pham
*Assistant Examiner* — Nicholas R Pasko
(74) *Attorney, Agent, or Firm* — Holtz, Holtz & Volek PC

(57) ABSTRACT

An inverted microscope includes an imaging lens configured to form an image of light which passes through an objective lens from a specimen, and a microscope main body in which a plurality of optical devices are configured to be arranged between the objective lens and the imaging lens in a direction of an optical axis of the objective lens and which includes therein a plurality of installation units that allow the plurality of optical devices to be fixed independently of one another. Each of the plurality of installation units includes an abutting reference surface on which any one of the plurality of optical devices is configured to be abutted. A plurality of abutting reference surfaces of the plurality of the installation units are shifted from one another in a direction perpendicular to the optical axis of the objective lens.

3 Claims, 10 Drawing Sheets

(56) References Cited

U.S. PATENT DOCUMENTS

| | | | |
|---|---|---|---|
| 6,239,905 B1 | 5/2001 | Toyoda et al. | |
| 6,813,071 B2 * | 11/2004 | Takahama | G02B 21/0088 359/380 |
| 6,865,021 B2 * | 3/2005 | Koyama | G02B 21/241 359/368 |
| 2002/0131165 A1 | 9/2002 | Takahama | |
| 2006/0066942 A1 * | 3/2006 | Kouno | G02B 21/0088 359/368 |
| 2007/0146872 A1 * | 6/2007 | Bocher | G02B 21/0088 359/386 |
| 2010/0315635 A1 | 12/2010 | Janzen et al. | |
| 2013/0075578 A1 * | 3/2013 | Kitahara | G02B 21/0088 250/201.3 |
| 2013/0286473 A1 * | 10/2013 | Tsuji | G02B 21/04 359/368 |

FOREIGN PATENT DOCUMENTS

| | | | | |
|---|---|---|---|---|
| JP | 11-072715 A | 3/1999 | | |
| JP | 11-344675 A | 12/1999 | | |
| JP | 2002267940 A | 9/2002 | | |
| JP | 2006091723 A | 4/2006 | | |
| JP | 2010532468 A | 10/2010 | | |
| JP | 2011248245 A | 12/2011 | | |
| JP | 2013114004 A | 6/2013 | | |
| WO | WO 2011/149090 | 12/2011 | | |
| WO | WO 2011149090 A1 * | 12/2011 | | G02B 21/0088 |

OTHER PUBLICATIONS

Japanese Office Action (and English translation thereof) dated Jan. 19, 2016, issued in counterpart Japanese Application No. 2012-082611.

* cited by examiner

SLIDE INSERTION DIRECTION

SLIDE INSERTION DIRECTION

SLIDE INSERTION DIRECTION

SLIDE INSERTION DIRECTION

INVERTED MICROSCOPE

CROSS-REFERENCE TO RELATED APPLICATIONS

This application is based upon and claims the benefit of priority from Japanese Patent Application No. 2012-082611, filed on Mar. 30, 2012, the entire contents of which are incorporated herein by reference.

BACKGROUND

1. Technical Field

The disclosure relates to an inverted microscope in which a specimen as an object to be observed is viewed from underneath.

2. Related Art

An inverted microscope has been proposed where a plurality of optical devices constituting an optical system such as a mirror unit for branching an optical path can be arranged between an objective lens and an imaging lens (refer to Japanese Patent Application Laid-open No. 11-72715, Japanese Patent Application Laid-open No. 11-38326, Japanese Patent Application Laid-open No. 11-344675, and the like). For example, Japanese Patent Application Laid-open No. 11-72715 discloses an inverted microscope where a spacer member is disposed between a stage on which a specimen is mounted and a stage support member for supporting the stage to lift the stage and thus a new optical device can be installed between an objective lens and an imaging lens by using a space formed due to the lifting.

SUMMARY

In accordance with some embodiments, an inverted microscope includes an imaging lens configured to form an image of light which passes through an objective lens from a specimen, and a microscope main body in which a plurality of optical devices are configured to be arranged between the objective lens and the imaging lens in a direction of an optical axis of the objective lens and which includes therein a plurality of installation units that allow the plurality of optical devices to be fixed independently of one another. Each of the plurality of installation units includes an abutting reference surface on which any one of the plurality of optical devices is configured to be abutted. A plurality of abutting reference surfaces of the plurality of the installation units are shifted from one another in a direction perpendicular to the optical axis of the objective lens.

The above and other features, advantages and technical and industrial significance of this invention will be better understood by reading the following detailed description of presently preferred embodiments of the invention, when considered in connection with the accompanying drawings.

DETAILED DESCRIPTION

Figure 1:
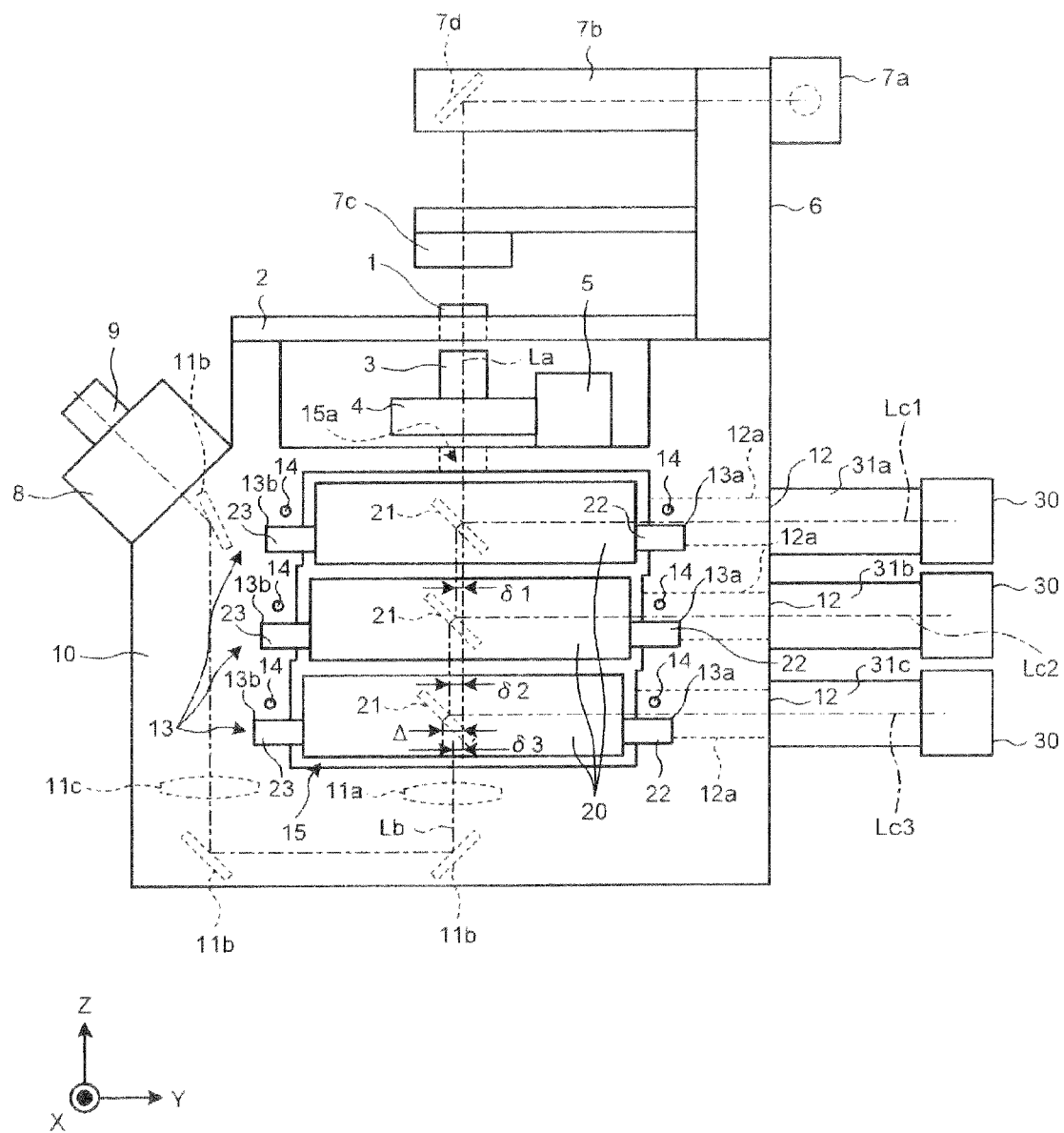
FIG. 1 is a schematic side view illustrating a configuration of an inverted microscope according to a first embodiment of the present invention.

Exemplary embodiments will be described with reference to the accompanying drawings. The present invention is not limited to the following embodiments. In the drawings, the same reference numerals are used to indicate the same or similar parts. It should be noted that, since each figure in the drawings is diagrammatically illustrated, dimensional relations and ratios among the components are different from actual ones. In addition, the dimensional relations and the ratios among the figures may be different.

First Embodiment

Figure 2:
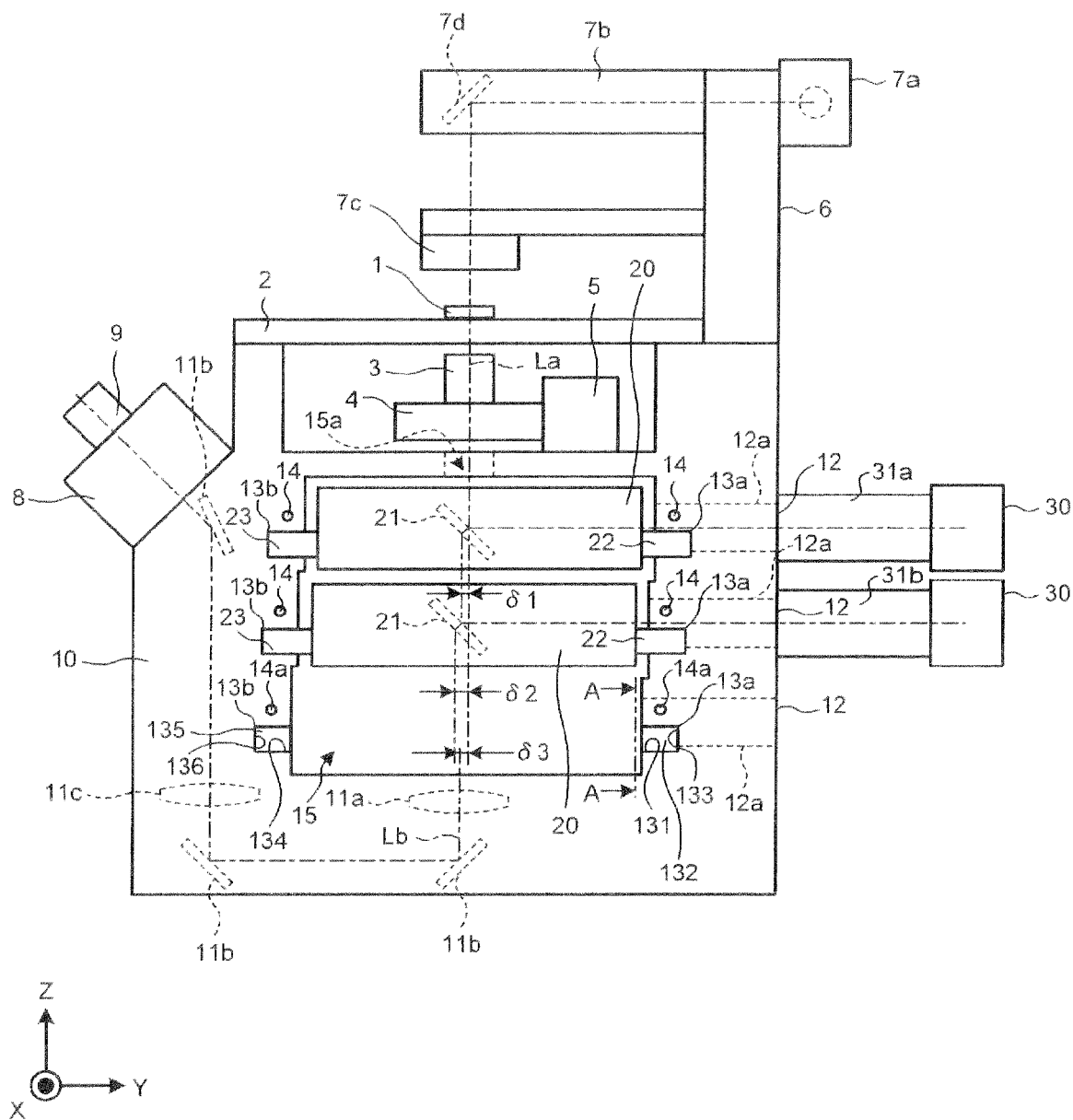
FIG. 2 is a side view illustrating a state where two optical devices are installed in the inverted microscope illustrated in FIG. 1.

FIGS. 1 and 2 are side views illustrating an inverted microscope according to a first embodiment of the present invention. The inverted microscope 100 according to the first embodiment is a microscope in which a specimen 1 as an observation object is viewed from underneath. In the inverted microscope 100, a plurality of optical devices, each of which has a function of branching and switching an optical path or a function of selecting of a specified wavelength component, is detachably arranged between an objective lens and an imaging lens. FIG. 1 illustrates a state where three optical devices are arranged in the inverted microscope 100, and FIG. 2 illustrates a state where two optical devices are arranged in the inverted microscope 100. In the description hereinafter, the side (left side in FIG. 1) where an ocular lens of the inverted microscope is installed is defined as a forward side or a front surface side, and the opposite side (right side in FIG. 1) is defined as a backward side or a rear surface side. Therefore, the sides illustrated in FIGS. 1 and 2 are the right sides of the inverted microscope 100.

As illustrated in FIG. 1, the inverted microscope 100 is configured to include a microscope main body 10, a stage 2 supported by the microscope main body 10, an objective lens 3 used for observing the specimen 1 mounted on the stage 2, a revolver 4 which is disposed under the stage 2 to hold the objective lens 3, and a focusing device 5 installed in the microscope main body 10. The revolver 4 can hold one or more objective lenses 3 and rotate to arrange one objective lens 3 on an optical path of an illumination light beam. The focusing device 5 is configured to move the revolver 4 upwards or downwards along an optical axis La of the objective lens 3 arranged on the optical path to adjust the focus of the objective lens 3 to the specimen 1.

A transmitted-light-illumination supporting post 6 is attached to the upper rear side of the microscope main body 10. A transmitted-light-illumination light source 7a, a light transmission projection device 7b, and a condenser lens 7c constituting a transmitted-light-illumination optical system are installed in the transmitted-light-illumination supporting post 6. A mirror 7d is installed in the light transmission projection device 7b, so that an illumination light beam emitted from the transmitted-light-illumination light source 7a passes through the light transmission projection device 7b and is reflected by the mirror 7d to be incident on the condenser lens 7c.

In the lower side of the microscope main body 10, an imaging lens 11a which forms an image of the observation light beam from the objective lens 3, a mirror 11b which bends the optical path of the observation light beam, and a relay lens 11c are disposed as an observation optical system. The imaging lens 11a is arranged at a position where an optical axis Lb of the imaging lens 11a is shifted from the optical axis La of the objective lens by δ3 in a direction perpendicular to the optical axis La. As described below, the shift amount δ3 is set to be a half of a total shift amount Δ. When the observation light beam from the objective lens 3 passes through the upper, middle, and lower optical path splitting mirrors 21, the optical path is shifted by the total shift amount Δ. The relay lens 11c is arranged such that an optical axis of the relay lens 11c is aligned with the optical axis of the imaging lens 11a.

A lens barrel 8 including the imaging lens therein and an ocular piece 9 including the ocular lens therein are assembled at the upper front side of the microscope main body 10. A user can observe an observation image of the specimen 1 by peeping into the ocular piece 9.

A space 15 is formed in a central portion of the microscope main body 10, that is, between the revolver 4 and the imaging lens 11a by digging out from the side of the one surface of the microscope main body 10. The space 15 is an area for installing a plurality of optical devices. In the first embodiment, the space 15 is formed on the right-side (front side of FIGS. 1 and 2) surface of the microscope main body 10 as seen from the front side of the microscope main body 10. The opposite-side surface of the microscope main body 10 is formed to be flat. A through-hole 15a through which the illumination light beam and the observation light beam can pass is formed in the upper portion of the space 15.

On the inner wall of the space 15, a plurality of installation units 13 (three installation units in FIGS. 1 and 2) for installing the plurality of optical devices in the microscope main body 10 are provided. Each of the installation units 13 includes a slide groove 13a (in the right side in the figure) and a slide groove 13b (in the left side in the figure) which have the same U-shape. In the first embodiment, as an example of optical devices, optical path splitting/switching devices 20 each having the optical path splitting mirror 21 are installed in the installation units 13. The optical path splitting mirror 21 is, for example, a half mirror which reflects the one half of an incident light beam and transmits the other half thereof. Alternatively, a dichroic mirror which reflects a specified wavelength component of an incident light beam and transmits the remaining wavelength component thereof may be used as the optical path splitting mirror 21.

Three through-holes 12a which penetrate the outer side of the microscope main body 10 and the space 15 are arranged side by side in a vertical direction on the rear surface of the microscope main body 10. An attachment portion 12 is formed at the end portion of the each through-hole 12a. Incident-light-illumination projection devices (light transmission tubes) 31a, 31b, and 31c where incident-light-illumination light sources 30 are assembled are attached to the attachment portions 12. Each illumination light beam emitted from each of the incident-light-illumination light sources 30 passes through each through-hole 12a through each of the incident-light-illumination projection devices 31a, 31b, and 31c to be incident on each optical path splitting/switching device 20. In other words, the incident-light-illumination light sources 30, the incident-light-illumination projection devices (light transmission tubes) 31a, 31b, and 31c, and the optical path splitting/switching devices 20 constitute an incident-light-illumination optical system.

Figure 3:
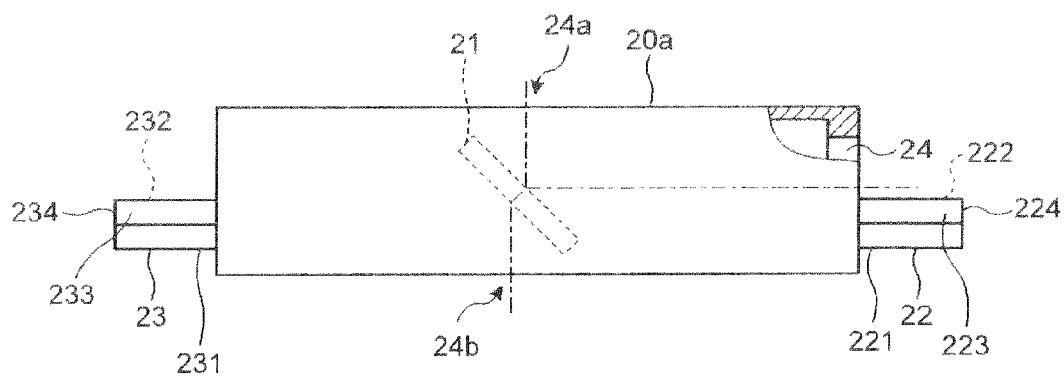
FIG. 3 is a front elevational view illustrating an optical path splitting/switching device illustrated in FIG. 1.
Figure 3:
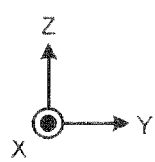
Figure 4:
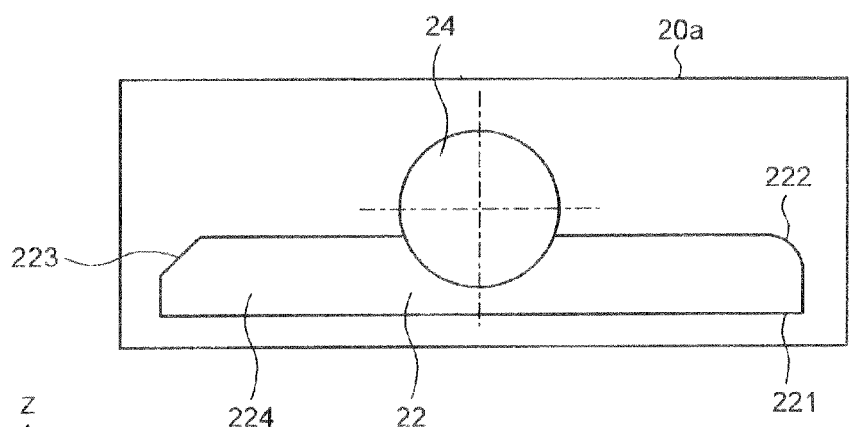
FIG. 4 is a side view illustrating the optical path splitting/switching device illustrated in FIG. 1.
Figure 4:
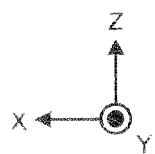
Figure 5:
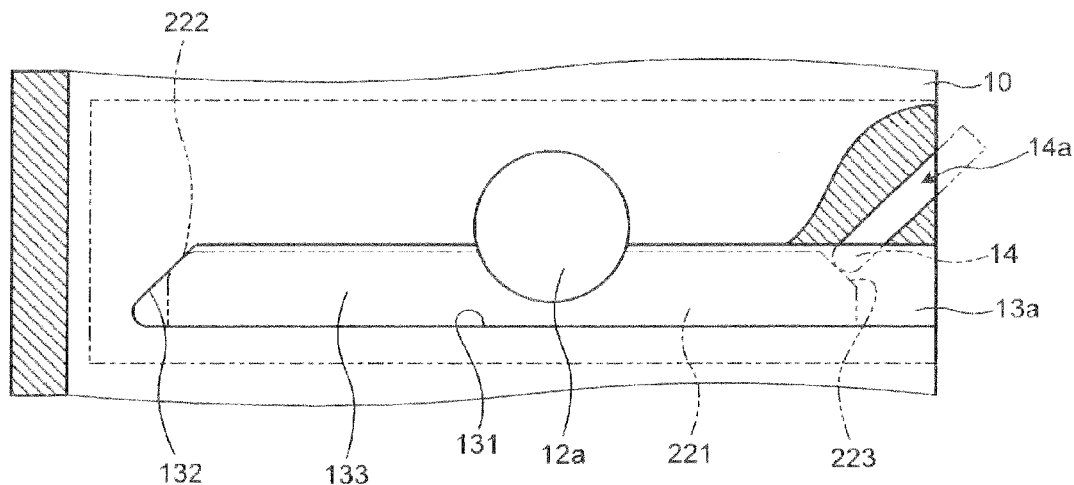
FIG. 5 is a cross-sectional view taken along line A-A of FIG. 2.

Next, the optical path splitting/switching device 20 installed in the microscope main body 10 will be described in detail. FIG. 3 is a front elevational view illustrating the optical path splitting/switching device 20; FIG. 4 is a side view illustrating the optical path splitting/switching device 20; and FIG. 5 is a cross-sectional view taken along line A-A of FIG. 2. In addition, in FIG. 5, a portion of the vicinity of a penetration screw hole 14a is also illustrated in the cross section. The inverted microscope 100 is arranged such that the front side of the optical path splitting/switching device 20 illustrated in FIG. 3 is directed to the right-side surface of the inverted microscope 100.

As illustrated in FIGS. 3 and 4, protrusions 22 and 23 which can be inserted into the slide grooves 13a and 13b, respectively, are formed in the both sides of a casing 20a of the optical path splitting/switching device 20. An aperture 24 for introducing the transmitted-light-illumination light beam is formed on the one side surface (rear-side surface when the optical path splitting/switching device 20 is installed in the microscope main body 10) of the optical path splitting/switching device 20. Therefore, in order to secure the aperture 24, the protrusion 22 of the side of the aperture 24 is formed in a shape where a portion thereof is notched. Apertures 24a and 24b for passing the illumination light beam and the observation light beam are formed on the upper and lower surfaces of the optical path splitting/switching device 20, respectively.

A lower surface 221 of the protrusion 22 is formed as a plane parallel to the lower surface of the optical path splitting/switching device 20. In addition, the one end portion of the upper surface of the protrusion 22 is formed as a chamfered arced surface 222 so that the cross section thereof has an arc shape. On the other hand, the other end portion of the upper surface of the protrusion 22 is formed as a chamfered inclined surface 223 so that the cross section thereof has a straight line shape. An end surface 224 of the rear side of the protrusion 22 is formed as a plane perpendicular to the lower surface 221.

A lower surface 231, an arced surface 232, an inclined surface 233, and an end surface 234 are formed in the protrusion 23 so as to have a mirror symmetry with those of the protrusion 22.

As illustrated in FIG. 5, a bottom surface 131 of the slide groove 13a provided in the microscope main body 10 is an abutting reference surface on which the lower surface 221 of the protrusion 22 is abutted. The back-side end portion of the slide groove 13a in the slide insertion direction is formed to be an inclined surface. The inclined surface 132 is an abutting reference surface on which the arced surface 222 of the protrusion 22 is abutted. An end surface 133 of the slide groove 13a is an abutting reference surface on which the end surface 224 (refer to FIG. 3) of the protrusion 22 is abutted. The penetration screw hole 14a into which a screw 14 is screwed is formed in the vicinity of the entrance of the slide groove 13a.

Similarly, the slide groove 13b into which the protrusion 23 is slidably inserted is configured to include a bottom surface 134 on which the lower surface 231 of the protrusion 23 is abutted, an inclined surface 135 on which the arced surface 232 of the protrusion 23 is abutted, and an end surface 136 on which the end surface 234 of the protrusion 23 is abutted. The penetration screw hole 14a is formed in the vicinity of the slide groove 13b (refer to FIG. 2).

In the case where the optical path splitting/switching device 20 is to be attached to the microscope main body 10, first, the protrusions 22 and 23 of the optical path splitting/switching device 20 are inserted into the slide grooves 13a and 13b; the lower surfaces 221 and 231, the arced surfaces 222 and 232, and the end surfaces 224 and 234 of the protrusions 22 and 23 are abutted on the bottom surfaces 131 and 134, the inclined surfaces 132 and 135, and the end surfaces 133 and 136 of the slide grooves 13a and 13b. Therefore, the position of the optical path splitting/switching device 20 in the three-axis (X, Y, and Z axis) directions with respect to the microscope main body 10 is aligned. In this state, the screw 14 is screwed into the penetration screw hole 14a to be abutted and pressed on the inclined surfaces 223 and 233. Therefore, the optical path splitting/switching device 20 is forced in the slide insertion direction and the downward direction so as to be fixed in the microscope main body 10. In addition, since the arced surfaces 222 and 232 are pressingly attached to the inclined surfaces 132 and 135, uplifting of the protrusions 22 and 23 from the bottom surfaces 131 and 134 of the slide grooves 13a and 13b is also prevented.

Although the three installation units 13 for attaching the optical path splitting/switching devices 20 are the same in terms of shape, the installation units 13 are arranged at the positions shifted from each other in the direction perpendicular to the optical axis La of the objective lens 3. More specifically, the installation unit 13 of the upper stage which is closest to the objective lens 3 is formed at the position where the center thereof is coincident with the optical axis La. The installation unit 13 of the middle stage is formed at the position where the end surfaces 133 and 136 are shifted with respect to the installation unit 13 of the upper stage by $\delta 1$ in the left direction of the figure. The installation unit 13 of the lower stage is formed at the position where the end surfaces 133 and 136 are shifted with respect to the installation unit 13 of the upper stage by $\delta 2$ ($\delta 2 > \delta 1$) in the left direction of the figure.

Therefore, when the three optical path splitting/switching devices 20 are attached to the three installation units 13, the optical paths of the incident-light-illumination optical system of the respective stages are shifted from each other. More specifically, in the incident-light-illumination optical system of the upper stage, the reflection position (intersection point between the reflecting plane and the optical axis Lc1) of the illumination light beam on the optical path splitting mirror 21 exists on the optical axis La of the objective lens 3. In the incident-light-illumination optical system of the middle stage, the reflection position (intersection point between the reflecting plane and the optical axis Lc2) of the illumination light beam on the optical path splitting mirror 21 is separated by a shift amount $\delta 1$ from the optical axis La of the objective lens 3 along the optical axis Lc2 of the illumination light beam. In the incident-light-illumination optical system of the lower stage, the reflection position (intersection point between the reflecting plane and the optical axis Lc3) of the transmitted-light-illumination light beam on the optical path splitting mirror 21 is separated by a shift amount $\delta 2$ from the optical axis La of the objective lens 3 along the optical axis Lc3 of the illumination light beam.

Herein, the shift amount $\delta 1$ corresponds to an amount of shift of the optical path due to diffraction of the observation light beam when the observation light beam passes through the optical path splitting mirror 21 of the upper stage. The shift amount $\delta 2$ corresponds to an amount of shift of the optical path due to diffraction of the observation light beam when the observation light beam passes through the optical path splitting mirrors 21 of the upper and middle stages. In the first embodiment, since the same optical path splitting mirrors 21 are used for the upper, middle, and lower stages, $\delta 2 = 2 \times \delta 1$.

Next, functions of the inverted microscope 100 will be described.

In the case where transmitted light illumination is performed on the specimen 1, an illumination light beam (transmitted-light-illumination light beam) is emitted from the transmitted-light-illumination light source 7a provided above the microscope main body 10. The optical path of the illumination light beam is bent by the mirror 7d in the light transmission projection device 7b, and the illumination light beam is condensed on a pupil surface of the condenser lens 7c. After that, the illumination light beam as a parallel light beam is irradiated on the specimen 1 to transmit the specimen 1.

In the case where incident light illumination is performed on the specimen 1, illumination light beams (transmitted-light-illumination light beams) are emitted from the incident-light-illumination light sources 30 of the upper, middle, and lower stages which are installed in the rear surface of the microscope main body 10. The illumination light beams are introduced through the incident-light-illumination projection devices 31a, 31b, and 31c and the through-holes 12a from the apertures 24 to the optical path splitting/switching devices 20. Next, the optical paths of the illumination light beams are bent upward by the optical path splitting mirrors 21 of the respective stages.

At this time, in the incident-light-illumination optical system of the upper stage, the illumination light beam is reflected to the direction of the optical axis La by the optical path splitting mirror 21 to be incident on the objective lens 3.

In the incident-light-illumination optical system of the middle stage, the reflection position of the illumination light beam on the optical path splitting mirror 21 is shifted by $\delta 1$ from the optical axis La. Therefore, after the illumination light beam is reflected to the direction parallel to the optical axis La, the illumination light beam is incident on the optical path splitting mirror 21 of the upper stage at the position separated by $\delta 1$ from the optical axis La. The optical path is shifted due to diffraction of the illumination light beam when the illumination light beam passes through the optical path splitting mirror 21 of the upper stage, so that the illumination light beam is incident through the optical axis La on the objective lens 3.

In the incident-light-illumination optical system of the lower stage, the reflection position of the illumination light beam on the optical path splitting mirror 21 is shifted by $\delta 2$ from the optical axis La. Therefore, after the illumination light beam is reflected to the direction parallel to the optical axis La, the illumination light beam is incident on the optical path splitting mirror 21 of the middle stage at the position separated by δ2 from the optical axis La. The optical path is shifted to the position separated by δ2−δ1 (=δ1) from the optical axis La due to diffraction of the illumination light beam when the illumination light beam passes through the optical path splitting mirror 21 of the middle stage. In addition, the optical path of the illumination light beam is shifted due to diffraction of the illumination light beam when the illumination light beam passes through the optical path splitting mirror 21 of the upper stage, so that the illumination light beam is incident through the optical axis La on the objective lens 3.

In this manner, by shifting the reflection positions of the optical path splitting mirrors 21 of the middle and lower stages by specified amounts with respect to the optical path splitting mirror 21 of the upper stage in advance, the illumination light beams from the respective stages can be combined on the optical axis La just before the incidence on the objective lens 3. Next, the illumination light beam incident on the objective lens 3 is irradiated on the specimen 1 to be reflected by the specimen 1.

The light beam (observation light beam) which transmits the specimen 1 or is reflected by the specimen 1 passes through the objective lens 3 to be converted into a parallel light beam having the optical axis La as a central axis. The parallel light beam sequentially passes through the optical path splitting mirrors 21 of the upper, middle, and lower stages. At this time, the observation light beam is refracted every time that the observation light beam passes through each optical path splitting mirror 21, and as a result, the optical path is parallel to the optical axis La and is shifted to the position separated by a shift amount Δ from the optical axis La. In addition, in FIG. 1, since the same optical path splitting mirrors 21 are used for the upper, middle, and lower stages, the shift amount Δ=3×δ1.

Next, the observation light beam is incident on the imaging lens 11a at the position separated by the shift amount Δ from the optical axis La.

Herein, the imaging lens 11a is arranged at the position where the optical axis Lb is shifted by a shift amount δ3 (δ3=Δ/2) from the optical axis La of the objective lens 3. Therefore, the observation light beam which passes through the optical path splitting mirror 21 of the lower stage is incident on the imaging lens 11a at the position shifted by Δ−δ3 (that is, Δ/2) from the optical axis Lb of the imaging lens 11a as a central position.

Next, the observation light beam is condensed by the imaging lens 11a, and the optical path thereof can be changed by the mirror 11b. After, the observation light beam is converted into a parallel light beam again by the relay lens 11c, the parallel light beam is incident through the mirror 11b into the lens barrel 8. In the lens barrel 8, the observation light beam is formed into an image by an imaging lens to be emitted through the ocular piece 9 from the inverted microscope 100. Therefore, a user can observe an observation image of the specimen 1.

Herein, in the inverted microscope 100, since each optical path splitting/switching device 20 is fixed by using the screw 14, the optical path splitting/switching device 20 can be attached and detached individually and easily. Therefore, the case where some of the optical path splitting/switching devices 20 are removed and the number of to-be-used incident-light-illumination optical systems is changed will be described. In addition, in the point of view of the optical performance, since a short length of the optical path is useful for illumination performance, it is preferable that the incident-light-illumination optical system of the upper stage is used with priority. For example, in the case where only one incident-light-illumination optical system is used, the optical path splitting/switching device 20 is installed only in the upper stage. In addition, in the case where two incident-light-illumination optical systems are used, the optical path splitting/switching devices 20 are installed in the upper and middle stages. FIG. 2 illustrates the latter state.

As illustrated in FIG. 2, even in the case where the optical path splitting/switching devices 20 are installed only in the upper and middle stages, as described above, the illumination light beams from the incident-light-illumination light sources 30 of the upper and middle stages are combined on the optical axis La to be incident on the objective lens 3.

The observation light beam which passes through the objective lens 3 passes through the optical path splitting mirrors 21 of the upper and middle stages, so that the observation light beam is incident on the imaging lens 11a in the state where the observation light beam is shifted by δ2 with respect to the optical axis La. In other words, in this state, the optical axis (hereinafter, referred to as an observation optical axis) of the observation light beam is shifted by |δ2−δ3| with respect to the optical axis Lb of the imaging lens 11a. In this case, the inter-axis distance between the observation optical axis and the optical axis Lb is shorter than the inter-axis distance (Δ−δ3) of the case where the optical path splitting/switching device 20 is also installed in the lower stage (refer to FIG. 1).

In the case where the optical path splitting/switching device 20 is installed only in the upper stage, the inter-axis distance between the observation optical axis and the optical axis Lb is |δ1−δ3|. In addition, in the case where all the optical path splitting/switching devices 20 are removed, the inter-axis distance between the observation optical axis (that is, the optical axis La) and the optical axis Lb is δ3.

In other words, although the number of the installed optical path splitting/switching devices 20 is changed, the inter-axis distance between the observation optical axis and the optical axis Lb can be suppressed to be δ3 (=Δ/2) or less by shifting the optical axis Lb of the imaging lens 11a from the optical axis La of the objective lens 3 by a half of the total shift amount Δ of the observation light beam in the case where the optical path splitting/switching devices 20 are installed in all the stages in advance.

As described above, according to the first embodiment, since the installation units 13 having the same shape with each other for installation of the optical path splitting/switching devices 20 constituting a portion of the incident-light-illumination optical systems are independently arranged between the revolver 4 and the imaging lens 11a, the optical path splitting/switching devices 20 can be attached to and detached from the microscope main body 10 individually and easily without a change in design of the microscope main body 10. Therefore, replacement of the installation of the incident-light-illumination optical system or changing of the number of installation stages can be easily performed, so that it is possible to improve expandability of the inverted microscope 100.

Particularly, in the first embodiment, since the optical path splitting/switching device 20 is installed in the microscope main body 10 in such a manner where the protrusions 22 and 23 of the optical path splitting/switching device 20 of each stage are inserted into the slide grooves 13a and 13b, the position of the optical path splitting/switching device 20 can be easily determined. In addition, since the fixing of the optical path splitting/switching device 20 is performed by using the screw 14, the installation and removal of the optical path splitting/switching device 20 can be simply performed.

In addition, according to the first embodiment, since the space 15 is prepared in one side surface of the microscope main body 10 and the installation units 13 is prepared on the inner wall of the space 15, the attachment and detachment of the optical path splitting/switching device 20 can be performed from the one side of the microscope main body 10. Therefore, it is possible to improve operability of the inverted microscope 100.

Furthermore, according to the first embodiment, since the central axis of the optical path splitting/switching device 20 is shifted by a specified amount in the direction perpendicular to the optical axis La of the objective lens 3, the optical path of the illumination light beam from the incident-light-illumination optical system of each stage can be shifted on the optical axis La of the objective lens 3 just before incidence on the objective lens 3. Therefore, it is possible to prevent deflection of the illumination on the specimen 1.

In addition, according to the first embodiment, since the position of the optical axis Lb of the imaging lens 11a is also shifted according to the shift amount of the optical path splitting/switching device 20 installed in the each stage with respect to the optical axis La, the inter-axis distance between the observation optical axis and the optical axis Lb can be suppressed to be small. Therefore, it is possible to configure the microscope main body 10 with a compact size without an increase in the effective diameters of the imaging lens 11a and the optical members of the following stages.

In the first embodiment described above, although the slide grooves 13a and 13b are formed to have a "U"-shaped side surface, the side surface shape of the slide grooves 13a and 13b is not limited thereto. For example, the slide grooves 13a and 13b may have a shape of an ant. In addition, as a fixing unit for fixing the optical path splitting/switching device 20 to the microscope main body 10, any unit other than the screw 14 may be used. For example, the retraction fixing using a screw or the like may be performed. In addition, the shift amount δ3 (distance between the optical axis La and the optical axis Lb) of the optical axis Lb of the imaging lens 11a with respect to the optical axis La of the objective lens 3 is not necessarily limited to the half of the total shift amount Δ occurring due to the passing of the observation light beam from the objective lens 3 through the optical path splitting mirrors 21 of the upper, middle, and lower stages. For example, the shift amount δ3 may be Δ/2 or less.

In addition, in the first embodiment, although the structure where three optical devices as the optical path splitting/switching devices 20 can be installed in the microscope main body 10 is described, the number of optical devices which can be installed in the microscope main body 10 is not particularly limited if the number is two or more.

Modified Example 1

Figure 6:
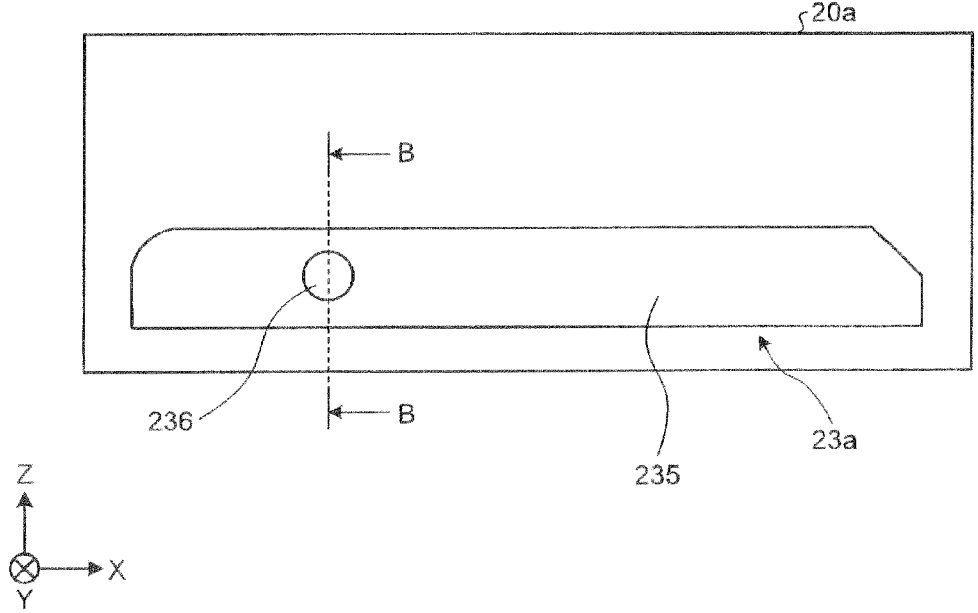
FIG. 6 is a side view illustrating an optical path splitting/switching device according to Modified Example 1 of the first embodiment.

Next, Modified Example 1 of the first embodiment will be described. FIG. 6 is a side view illustrating an optical path splitting/switching device of Modified Example 1. In addition, FIG. 7 is a front elevational view illustrating the optical path splitting/switching device illustrated in FIG. 6 and illustrates a cross section taken along line B-B of FIG. 6.

Figure 7:
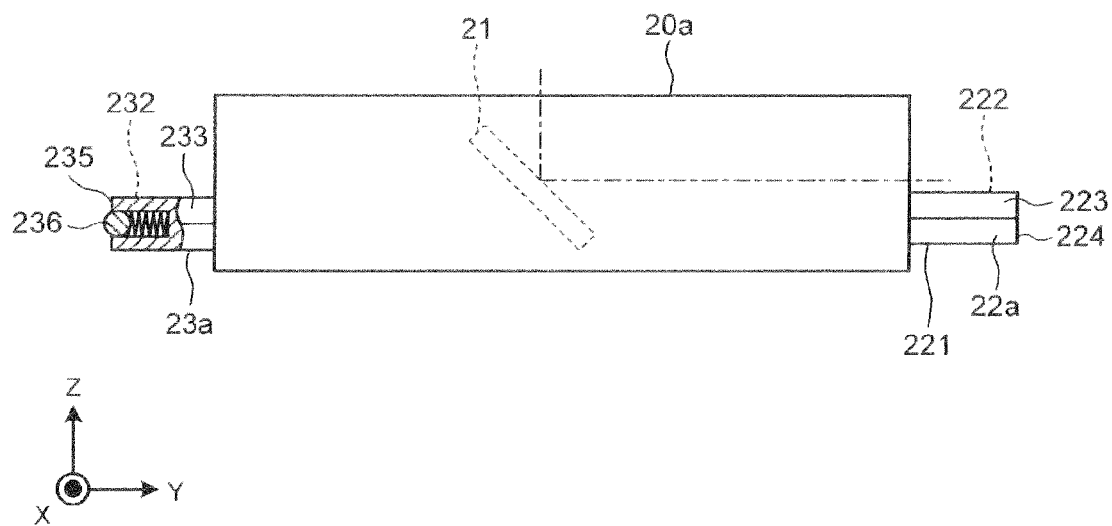
FIG. 7 is a front elevational view illustrating the optical path splitting/switching device according to Modified Example 1 of the first embodiment.
Figure 7:
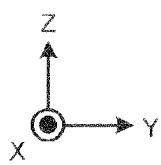

As illustrated in FIGS. 6 and 7, similarly to the first embodiment, the optical path splitting/switching device 20A is configured to include the casing 20a, and protrusions 22a and 23a are provided on the both side surfaces thereof. The shape of the protrusion 22a is the same as that of the first embodiment. On the other hand, although the outer shape of the protrusion 23a is the same as that of the protrusion 23 of the first embodiment, the protrusion 23a is different from the protrusion 23 of the first embodiment in that an elastic member is incorporated into the protrusion 23a.

An aperture is provided on an end surface 235 of the protrusion 23a, and a ball plunger 236 as an elastic member can be assembled into the aperture. An end portion of the ball plunger 236 is slightly protruded outwards from the end surface 235. When the optical path splitting/switching device 20A is inserted into the installation unit 13 (refer to FIG. 2) installed in the microscope main body 10, the end portion of the elastic member 236 is in contact with the end surface 136 of the slide groove 13b to be pushed, so that a pressing force is exerted on the end surface 136. Due to the counter force of the pressing force, the end surface 224 of the side of the protrusion 22a can be abutted on the end surface 133 of the slide groove 13a. Therefore, the position of the optical path splitting/switching device 20A can be performed accurately and easily.

Second Embodiment

Next, the second embodiment of the present invention will be described.

Figure 8:
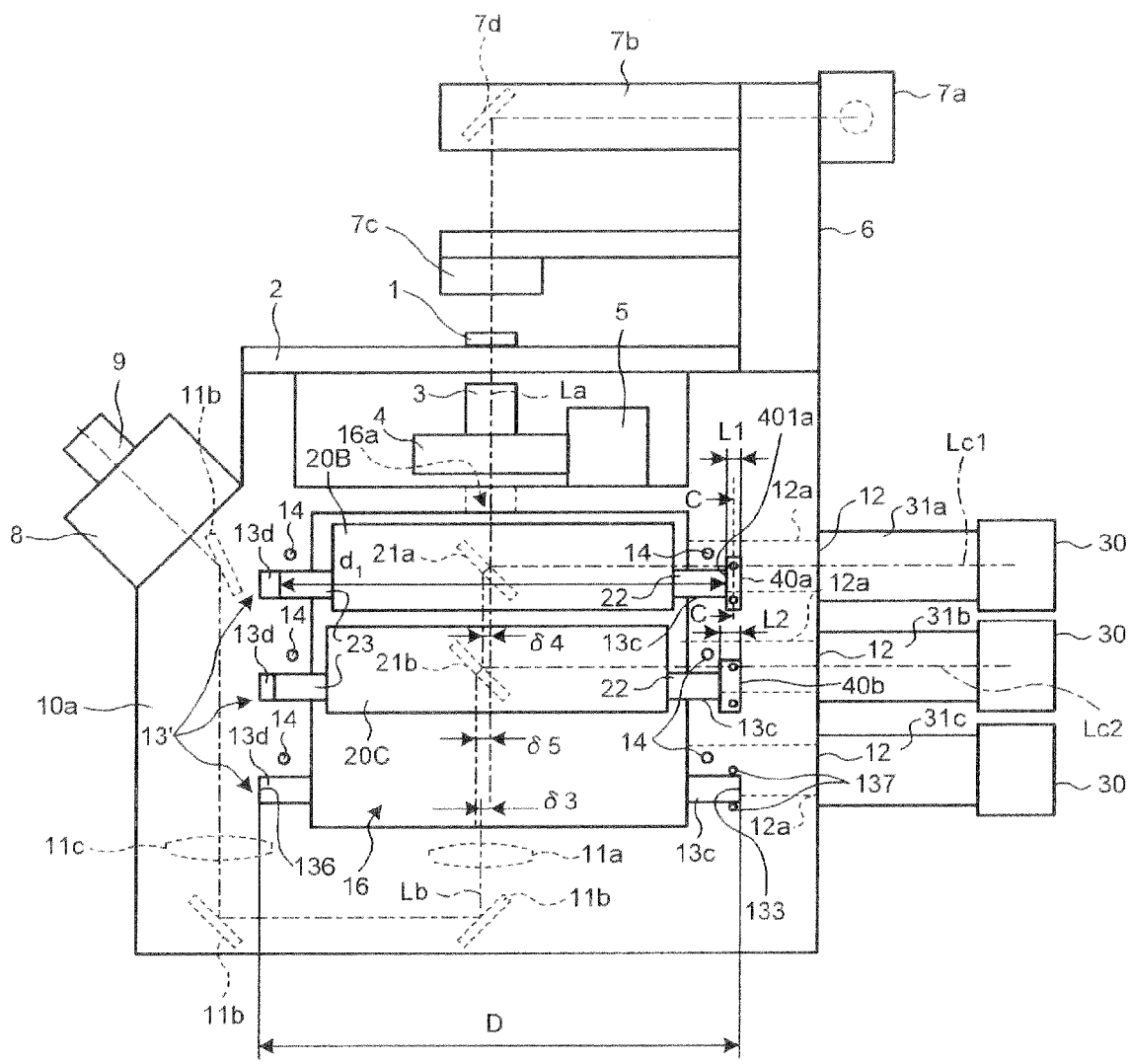
FIG. 8 is a schematic side view illustrating a configuration of an inverted microscope according to a second embodiment of the present invention.

FIG. 8 is a schematic side view illustrating an inverted microscope according to a second embodiment of the present invention. As illustrated in FIG. 8, the inverted microscope 200 according to the second embodiment is configured to include a microscope main body 10a. The overall shape and structure of the microscope main body 10a are the same as those of the microscope main body 10 of the first embodiment, and the structure of an installation unit 13' where an optical device is installed in the microscope main body is different from that of the first embodiment.

FIG. 8 illustrates a case where an optical path splitting/switching device 20B is installed in the upper stage; an optical path splitting/switching device 20C is installed in the middle stage; and no optical device is installed in the lower stage. The structures of the optical path splitting/switching devices 20B and 20C are the same as that of the optical path splitting/switching device 20 described in the first embodiment, and the optical path splitting/switching devices 20B and 20C are different from the optical path splitting/switching device 20 in terms of the thickness of optical path splitting mirrors 21a and 21b embedded in the optical path splitting/switching devices 20B and 20C.

A space 16 is provided in a central portion of the microscope main body 10a, that is, between the revolver 4 and the imaging lens 11a by digging out from the side of one surface of the microscope main body 10a. The space 16 is an area for installing a plurality of optical devices (optical path splitting/switching devices 20B and 20C and the like). In addition, a through-hole 16a which an illumination light beam and an observation light beam can pass through is provided in the upper portion of the space 16.

On the inner wall of the space 16, a plurality of installation units 13' (three installation units in FIG. 8) for installing a plurality of optical devices in the microscope main body 10a is provided Each of the installation units 13' includes a slide groove 13c (in the right side of the figure) and a slide groove 13d (in the left side of the figure) which are formed in the same U-shape. The arrangements of the installation units 13' in the direction perpendicular to the optical axis La of the objective lens 3 are the same. Therefore, the distance D between the end surfaces 133 and 136 of the slide grooves 13c and 13d of each stage is also the same as those of the other stages. In addition, the distance D is larger than $d_1$ between the two ends of the protrusions 22 and 23 formed in the optical path splitting/switching devices 20B and 20C.

A spacer 40a is installed in the slide groove 13c of the upper stage; and a spacer 40b of which width (length in the same direction as that of the interval D) is different from the width of the spacer 40a is installed in the slide groove 13c of the middle stage. Hereinafter, the width of the spacer 40a of the upper stage is defined by L1; and the width of the spacer 40b of the middle stage is defined by L2.

Figure 9:
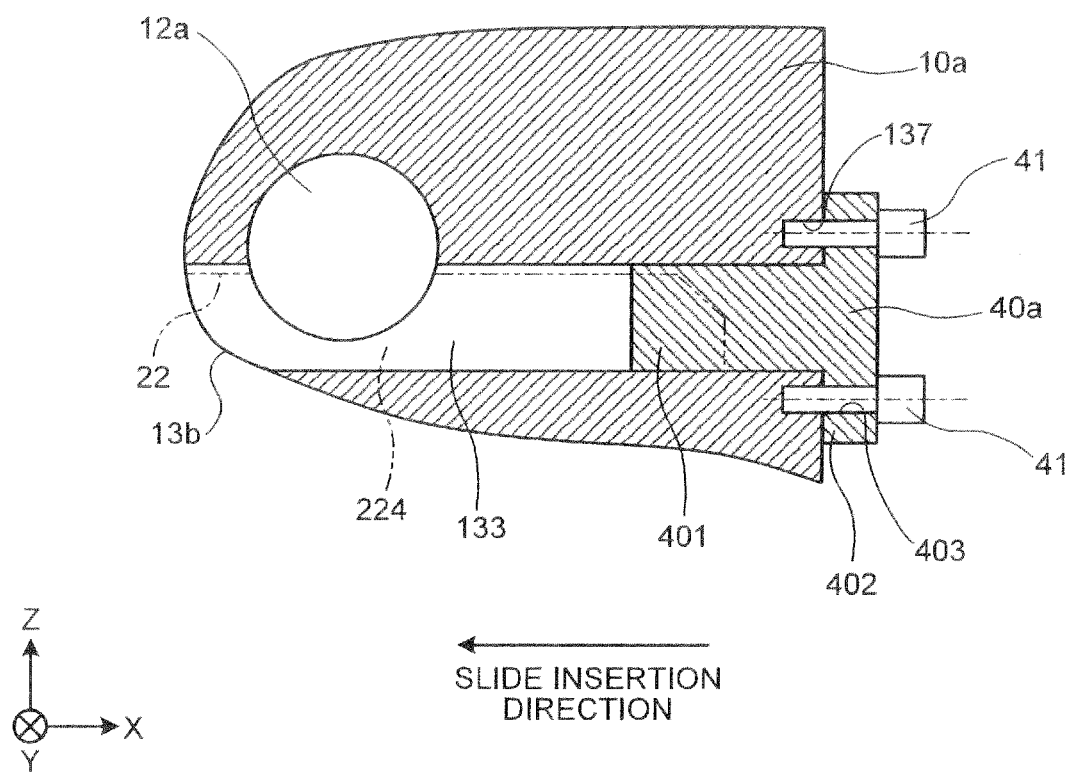
FIG. 9 is a cross-sectional view taken along line C-C of FIG. 8.

FIG. 9 is a cross-sectional view taken along line C-C of FIG. 8 and is a diagram for describing a structure of the spacer 40a. As illustrated in FIG. 9, the spacer 40a is configured to include an insert portion 401 which is inserted into the slide groove 13c and a fixed portion 402 which is fixed to the microscope main body 10a. A through-hole 403 is formed in the fixed portion 402. In addition, a screw hole 137 is formed in the end surface in the vicinity of the entrance of the slide groove 13c on which the fixed portion 402 abuts. By screwing a set screw 41 through the through-hole 403 into the screw hole 137, the fixed portion 402 is fixed to the microscope main body 10a. The length (depth of insertion into the slide groove 13c) of the insert portion 401 in the slide insertion direction is defined by the length of at least a portion of the end surface 224 of the protrusion 22 abutting on the insert portion 401 when the protrusion 22 of the optical path splitting/switching device 20B is inserted into the slide groove 13c. In other words, a side surface 401a (refer to FIG. 8) of the insert portion 401 abutting on the end surface 224 is the abutting reference surface of the optical path splitting/switching device 20B.

The structure of the spacer 40b is also the same as that of the spacer 40a, and thus, the description thereof is not provided.

In the case where the optical path splitting/switching device 20B is to be installed in the installation unit 13' of the upper stage, first, the spacer 40a is attached to the side of the slide groove 13c. Next, the protrusions 22 and 23 are inserted into the slide grooves 13c and 13d, so that the end surface 224 of the protrusion 22 is abutted on the spacer 40a. In this state, the screw 14 is screwed into the penetration screw hole 14a to be abutted on the inclined surfaces 223 and 233 (refer to FIGS. 3 and 5) of the protrusions 22 and 23, so that the optical path splitting/switching device 20B is fixed. In addition, in the same method, the optical path splitting/switching device 20C is installed in the installation unit 13' of the middle stage.

Herein, a width L1 of the spacer 40a attached to the slide groove 13c of the upper stage is determined so that the reflection position of the illumination light beam emitted from the incident-light-illumination light source 30 on the optical path splitting mirror 21a is coincident with the optical axis La of the objective lens 3. In addition, a width L2 of the spacer 40b attached to the slide groove 13c of the middle stage is determined based on a shift amount δ4 of the shifting of the optical path from the optical axis La due to diffraction when the illumination light beam and the observation light beam pass through the optical path splitting mirror 21a of the upper stage. In addition, in the case where the optical path splitting/switching device is also installed in the lower stage, the width of the spacer attached to the slide groove 13c of the lower stage is determined based on a total shift amount δ5 of the shifting of the optical path from the optical axis La due to diffraction when the light beam passes through the optical path splitting mirrors 21a and 21b of the upper and middle stages.

As described above, in the second embodiment, the abutting reference surface for determining the positions of the optical path splitting/switching devices 20B and 20C is shifted by installing the spacers 40a and 40b having different widths to the slide groove 13c. In this case, since the shapes and positions of the installation units 13' can be aligned in the upper, middle, and lower stages, it is possible to simplify the design of the microscope main body 10a. In addition, since the positions of the optical path splitting/switching devices 20B and 20C in the direction perpendicular to the optical axis La can be easily determined by appropriately selecting the spacers 40a and 40b, the configuration of the microscope main body 10a is simplified, so that it is possible to manufacture the microscope main body 10a at a low price.

In addition, the fixing of the spacers 40a and 40b to the slide groove 13c is released by unfastening the set screw 41, the spacers 40a and 40b can be easily replaced. Therefore, the positions of the optical path splitting/switching devices 20B and 20C can be separately adjusted by optically appropriate amounts. Accordingly, change in the installation positions of the optical path splitting/switching devices 20B and 20C or replacement with different types of optical devices having different shift amounts of the optical path can be easily performed. In other words, it is possible to further improve expandability of the inverted microscope 200 while securing necessary optical performance.

Modified Example 2

Figure 10:
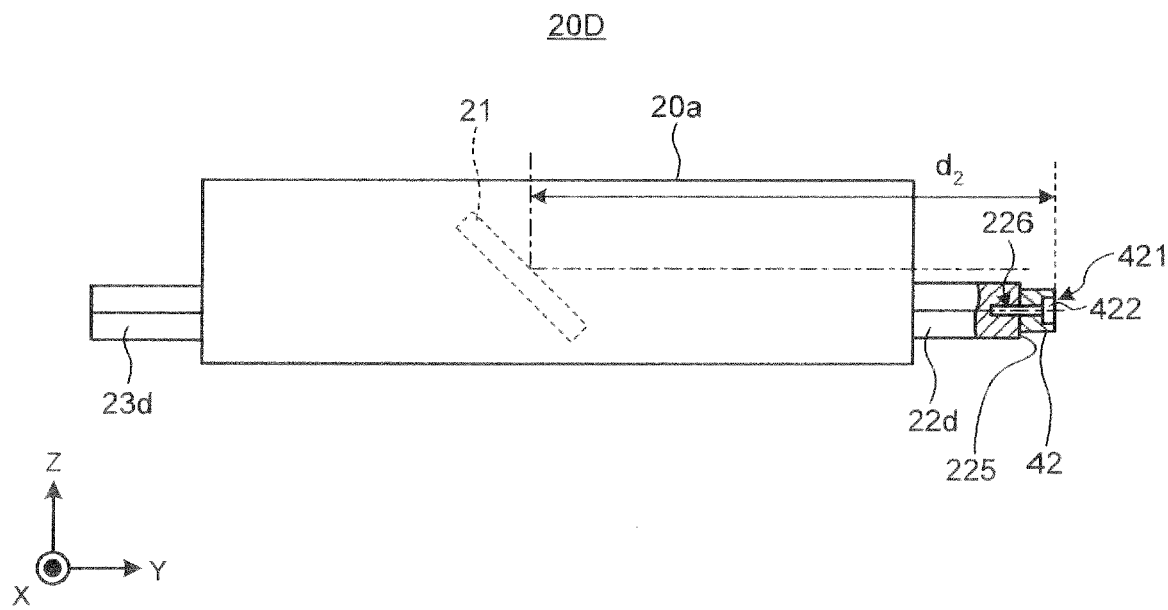
FIG. 10 is a front elevational view illustrating an optical path splitting/switching device according to Modified Example 2 of the second embodiment.
Figure 11:
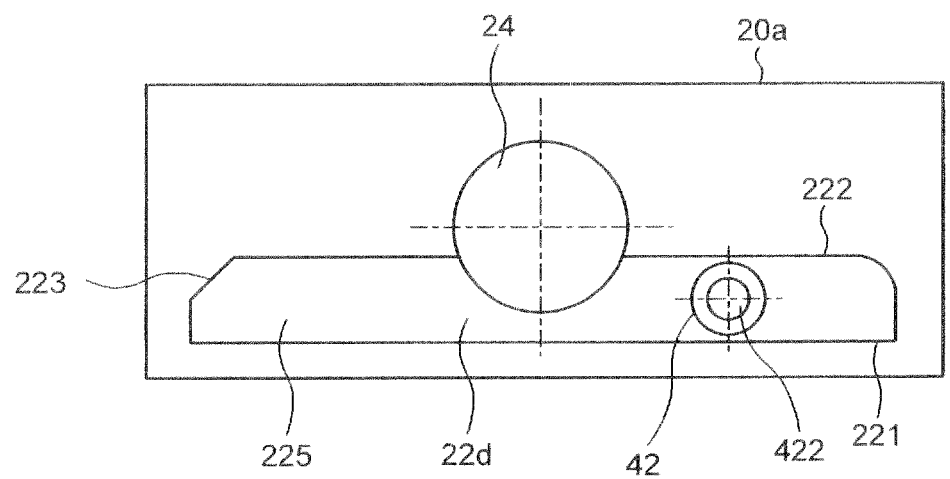
FIG. 11 is a side view illustrating the optical path splitting/switching device illustrated in FIG. 10.
Figure 11:
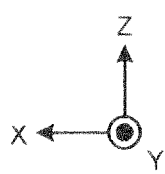

Next, Modified Example 2 of the second embodiment will be described. FIG. 10 is a front elevational view illustrating an optical path splitting/switching device according to Modified Example 2. FIG. 11 is a side view illustrating the optical path splitting/switching device illustrated in FIG. 10. When the optical path splitting/switching device illustrated in FIG. 8 is to be installed on the inverted microscope 200, although the spacer is prepared in the slide groove 13c in the second embodiment, a spacer may be provided on the side of the optical path splitting/switching device.

As illustrated in FIGS. 10 and 11, similarly to the first embodiment, the optical path splitting/switching device 20D is configured to include a casing 20a, and protrusions 22d and 23d are provided on the both side surfaces thereof. The shape of the protrusion 23d is the same as that of the protrusion 23 (refer to FIG. 3) of the first embodiment. On the other hand, although the outer shape of the protrusion 22d is the same as that of the protrusion 22 of the first embodiment, the protrusion 22d is different from the protrusion 22 of the first embodiment in that a screw hole 226 for installing a spacer 42 is provided on an end surface 225.

A counterbore hole 421 is provided in the spacer 42. A set screw 422 is arranged in the counterbore hole 421 and is screwed into the screw hole 226, so that the spacer 42 is detachably fixed to the protrusion 22d.

According to Modified Example 2, the spacer 42 is detachably installed on the protrusion 22d, so that a distance $d_2$ from the end surface of the spacer 42, that is, the abutting surface which is abutted on the end surface 133 of the slide groove 13c to the central axis of the optical path splitting mirror 21 can be changed. Therefore, the position of the optical path splitting/switching device 20D in the direction perpendicular to the optical axis La can be easily determined.

Third Embodiment

Next, a third embodiment of the present invention will be described.

Figure 12:
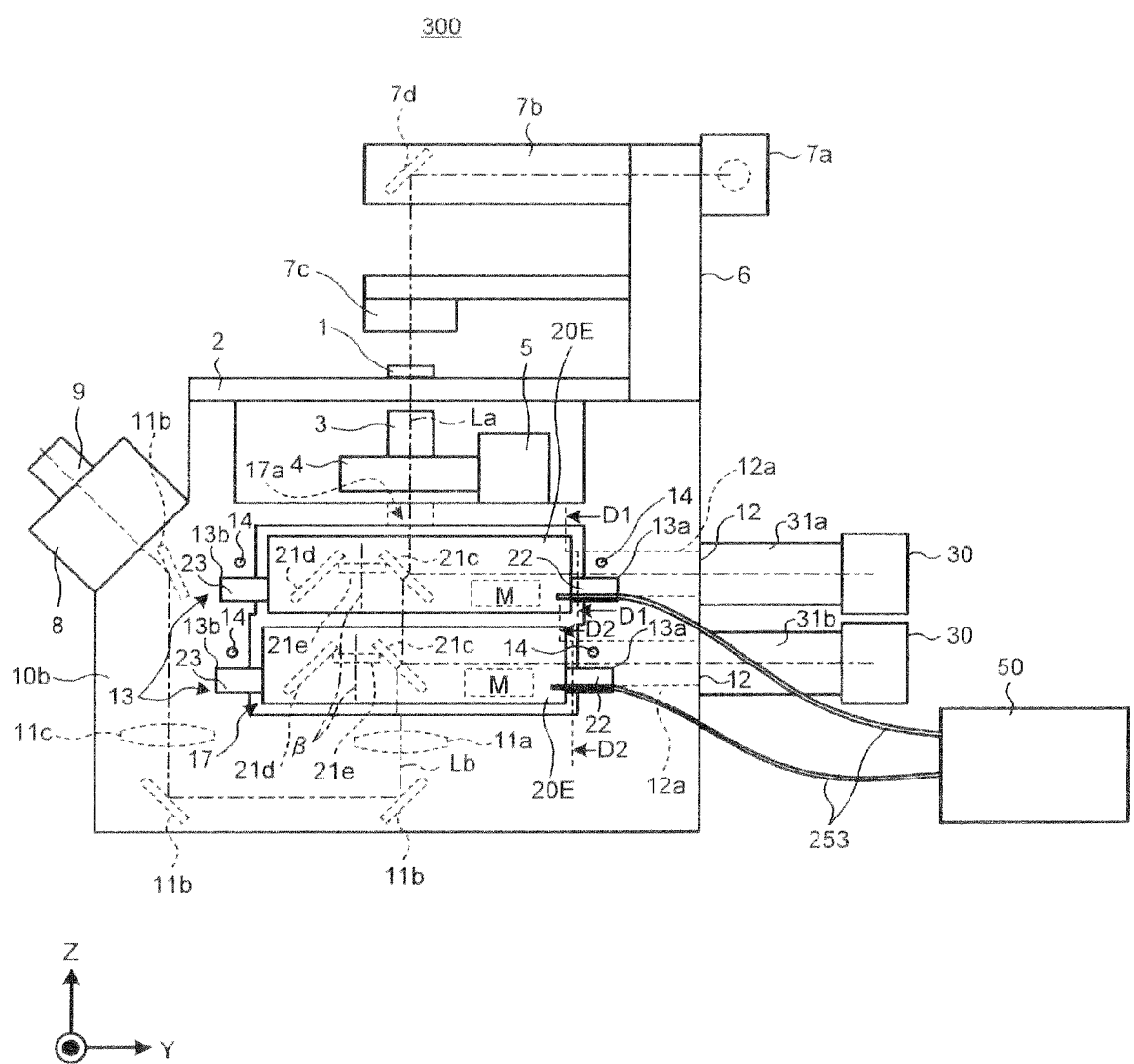
FIG. 12 is a schematic side view illustrating a configuration of an inverted microscope according to a third embodiment of the present invention.

FIG. 12 is a schematic side view illustrating an inverted microscope according to a third embodiment of the present invention. The inverted microscope 300 according to the third embodiment has a feature in that an installation position of an optical device installed in the microscope main body is automatically detected.

As illustrated in FIG. 12, the inverted microscope 300 is configured to include a microscope main body 10b. The overall shape and structure of the microscope main body 10b are the same as those of the microscope main body 10 of the first embodiment, and the number of optical devices which can be installed in a space 17 which is prepared for installation of a plurality of optical devices (optical path splitting/switching devices 20E and the like) is different from that of the first embodiment. In addition, a through-hole 17a which an illumination light beam and an observation light beam can pass through is provided in the upper portion of the space 17.

Plural stages (two stages in FIG. 12) of installation units 13 for installing the optical devices in the microscope main body 10b are provided on the inner wall of the space 17. The structures and arrangements (the shift amounts in the direction perpendicular to the optical axis La) of the installation units 13 of the respective stages are the same as those of the first embodiment.

In addition, a control unit 50 is connected through a cable 253 to the microscope main body 10b.

Each optical path splitting/switching device 20E includes different types of optical path splitting mirrors 21c and 21d, a support unit 21e which rotatably supports the optical path splitting mirrors 21c and 21d, and a motor M which rotates the support unit 21e. The motor M is connected through the cable 253 to the control unit 50, so that the motor M is operated under the control of the control unit 50.

The optical path splitting mirrors 21c and 21d are, for example, dichroic mirrors which reflect and transmit light beams having different wavelengths. Therefore, the shift amounts of the shifting of the optical path in the direction perpendicular to the optical axis La of the objective lens 3 are different between the optical path splitting mirrors 21c and 21d due to diffraction when the light beams pass through the optical path splitting mirrors 21c and 21d. By driving the motor M, the support unit 21e and the optical path splitting mirrors 21c and 21d are rotated through β-axis rotation. Therefore, the mirror arranged on the optical axis La of the objective lens 3 is switched.

Figure 13:
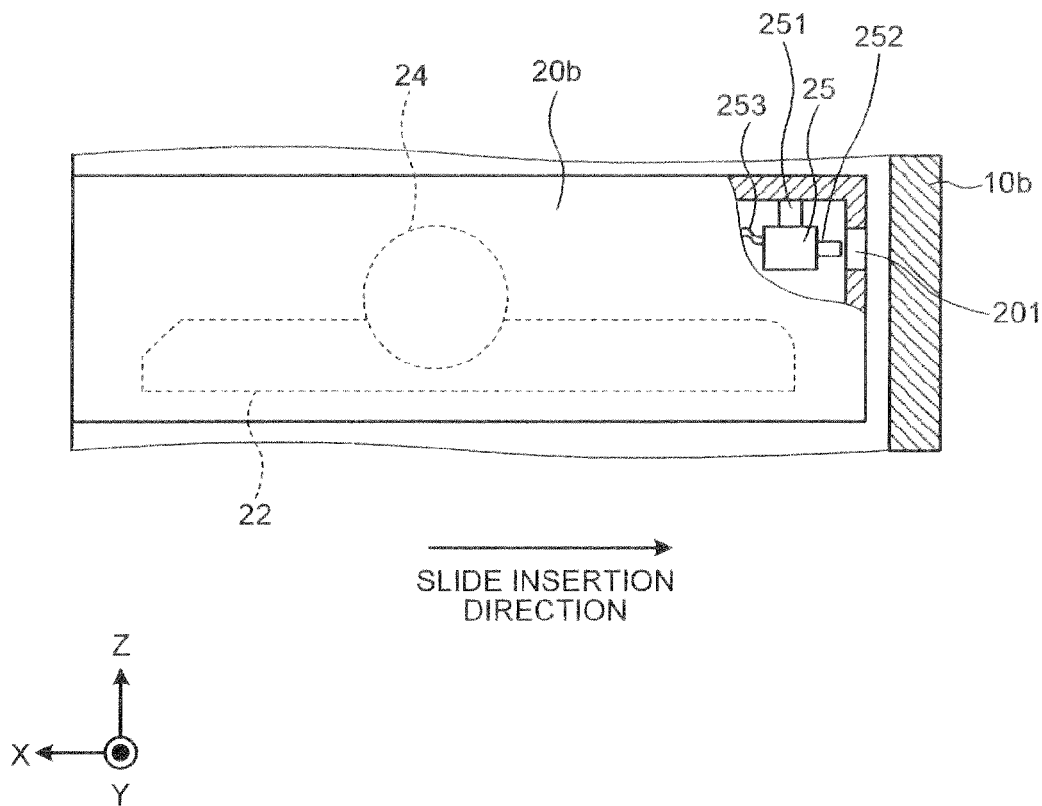
FIG. 13 is a cross-sectional view taken along line D1-D1 of FIG. 12.
Figure 14:
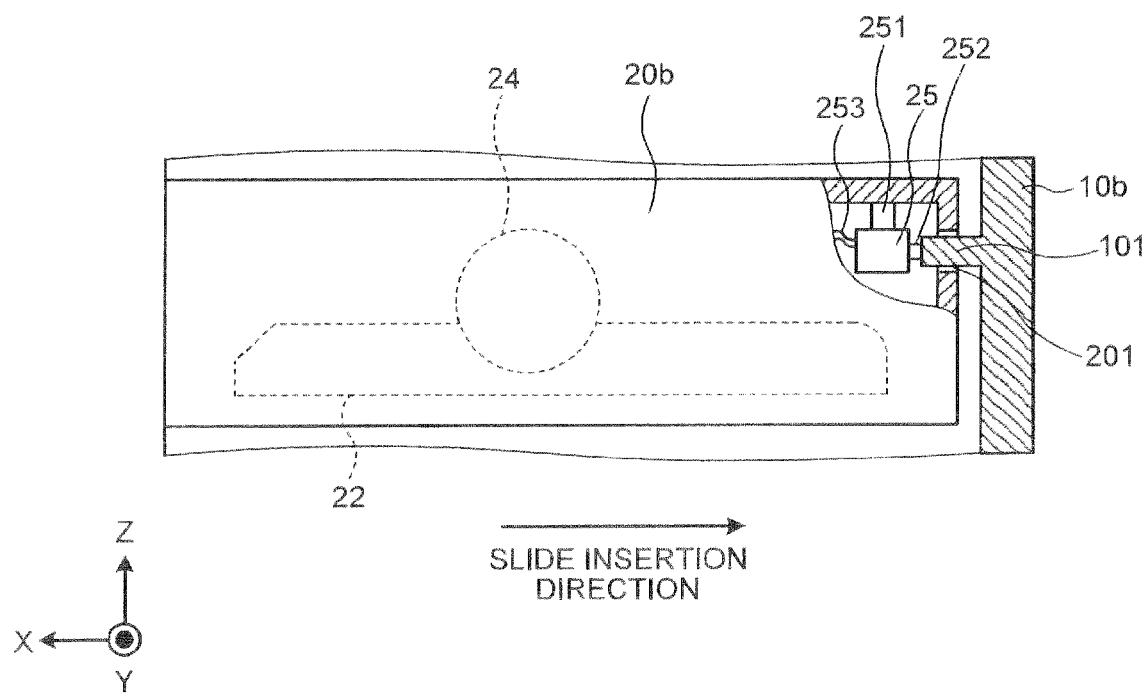
FIG. 14 is a cross-sectional view taken along line D2-D2 of FIG. 12.

FIG. 13 is a cross-sectional view taken along line D1-D1 of FIG. 12 and illustrates a configuration in the vicinity of the side surface of the optical path splitting/switching device 20E of the upper stage. FIG. 14 is a cross-sectional view taken along line D2-D2 of FIG. 12 and illustrates a configuration in the vicinity of the side surface of the optical path splitting/switching device 20E of the lower stage.

As illustrated in FIGS. 13 and 14, an aperture 201 is formed in a casing 20b of the optical path splitting/switching device 20E. In addition, a detecting unit 25 is provided at the position facing the aperture 201 in the casing 20b. The detecting unit 25 is a so-called switch member and is fixed to the casing 20b through a fixed portion 251 in the upper side of the figure. In addition, a detecting member 252 is formed in the side of the detecting unit 25 facing the aperture 201, and the cable 253 is connected to the opposite side thereof. An electric circuit is installed inside the detecting unit 25, and by pressing the detecting member 252, the electric circuit is opened or closed. In addition, the detecting unit 25 is connected through the cable 253 to the control unit 50.

As illustrated in FIG. 14, a projected portion 101 as a to-be-detected portion with respect to the detecting unit 25 is provided on the wall surface (microscope main body 10b) of the end portion of the optical path splitting/switching device 20E of the lower stage in the slide insertion direction. The projected portion 101 is smaller than the aperture 201, and the length thereof is formed so that the projected portion 101 can press on the end surface of the detecting member 252 when the optical path splitting/switching device 20E is to be installed in the installation unit 13 (refer to FIG. 1). In other words, the detecting unit 25 and the projected portion 101 constitute a detecting device (detecting means) for detecting the installation position of the optical path splitting/switching device 20E. In addition, FIG. 14 illustrates the state where the projected portion 101 presses the detecting member 252.

In the inverted microscope 300, when the optical path splitting/switching device 20E is to be installed in the installation unit 13 of the lower stage, the projected portion 101 is inserted into the aperture 201 to press the detecting member 252. Therefore, the opened/closed state of the electric circuit in the detecting unit 25 is switched, so that an electrical signal is transmitted through the cable 253 to the control unit 50. The control unit 50 receives the electrical signal to identify which stage of the microscope main body 10b the optical path splitting/switching device 20E is installed in.

The control unit 50 transmits a control signal for controlling the motor M through the cable 253 according to the installation stage of the optical path splitting/switching device 20E, so that the optical path splitting mirrors 21c and 21d embedded in the desired optical path splitting/switching device 20E are switched.

As described above, according to the third embodiment, in the case where the optical path splitting/switching devices 20E having features of automatic operation are used, the stages where automatic detection of the optical path splitting/switching devices 20E are installed can be individually performed to identify the respective optical path splitting/switching devices 20E, so that the optical path splitting/switching devices 20E can be individually controlled.

In addition, in the third embodiment, although one detecting unit 25 and one projected portion 101 are prepared, the detecting unit 25 and the projected portion 101 may be provided in parallel for each stage. In this case, even in the case where three stages or more of optical devices are installed in the microscope main body, the same control can be performed.

In addition, in the third embodiment, although a contact type switch is used as the detecting unit 25, the type of the switch is not limited thereto. For example, a non-contact type optical or magnetic sensor may be used.

As described above, according to the first to third embodiments, since a plurality of installation units which allows a plurality of optical devices to be fixed independently of one another is provided in the microscope main body, any of the optical devices can be easily attached to and detached from the microscope main body without a change in design of the microscope main body. In some embodiments, since a plurality of abutting reference surfaces of the plurality of installation units is shifted from one another in a direction perpendicular to the optical axis of the objective lens, the optical axes of the light beams passing through the optical devices are also shifted in the same manner, so that necessary and sufficient optical performance can be achieved according to the positions of the optical devices and the number of the optical devices in the inverted microscope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverted microscope comprising:
   an imaging lens configured to form an image of light which passes through an objective lens from a specimen; and
   a microscope main body in which a plurality of optical devices are configured to be arranged between the objective lens and the imaging lens along a first direction, the first direction being a direction in which an optical axis of the objective lens extends, and the microscope main body including therein a plurality of installation units into which the plurality of optical devices are insertable and fixable independently of one another;
   wherein:
   each of the plurality of installation units includes an abutting reference surface on which any one of the plurality of optical devices is configured to be abutted;
   each of the plurality of installation units includes a groove to which one of the plurality of optical devices is configured to be fitted, one end surface of the groove corresponding to the abutting reference surface;
   the groove is provided on a first surface of an installation space for the plurality of optical devices, the installation space defining the plurality of installation units and being provided on one side surface of the microscope main body;
   each of the plurality of installation units further includes a second groove which is provided on a second surface of the installation space opposed to the first surface so as to be parallel to the groove;
   the plurality of optical devices are configured to be attached to and detached from the one side surface of the microscope main body, the plurality of optical devices being insertable into and removable from the microscope main body in a second direction perpendicular to the first direction; and
   the plurality of abutting reference surfaces of the plurality of the installation units are shifted with respect to one another in a third direction mutually perpendicular to both of the first direction and the second direction.

2. The inverted microscope according to claim 1, further comprising a detecting device configured to detect installation positions of the plurality of optical devices in the microscope main body.

3. The inverted microscope according to claim 2, wherein the detecting device includes:
   a to-be-detected portion provided in the microscope main body corresponding to each of the installation positions; and
   a detecting unit provided in each of the plurality of optical devices to detect the to-be-detected portion.

* * * * *